Patented Dec. 29, 1931

1,838,367

UNITED STATES PATENT OFFICE

ELTON R. DARLING, OF DANVILLE, ILLINOIS, ASSIGNOR TO CORNSTALK PRODUCTS COMPANY, INC., OF DANVILLE, ILLINOIS, A CORPORATION OF DELAWARE

PREPARATION OF HIGH ALPHA CELLULOSIC PULP

No Drawing.   Application filed March 31, 1930.  Serial No. 440,617.

The present invention relates to an improvement in the process of manufacturing high alpha cellulose.

One of the objects of the invention is to provide a raw material for the manufacture of high alpha cellulose which, when subjected to the treatment as laid down in the co-pending application, will be productive of a cellulosic product running uniformly from 95 to 96% of alpha cellulose.

Another object of the invention is to treat cellulose of the type derived from plants of annual growth such as cornstalks, bagasse, straw, sorghum stalks, etc., under pressure with water so as to form a raw material more particularly suitable for conversion into high alpha cellulose in accordance with the process described in the said co-pending application and which process is substantially as described hereinbelow.

A further object is to produce cellulose yielding a softer and more uniform paper.

Cornstalk cellulose pulp, after bleaching and in the condition in which ordinarily it would be ready for conversion into paper pulp or paper, is subjected to a solution of sodium hydroxide having a sodium hydroxide content of from 4 to 6% (4 to 6 grams per 100 cubic centimeters of solution). The temperature at which the cellulose is treated is preferably near the freezing point.

The sodium hydroxide solution may be used for repeated lots of cellulose until its specific gravity has increased to 1.075.

The solution will take up xylan and other alkali-soluble constituents of the cellulose leaving the high-alpha cellulose in substantially pure form.

In the said co-pending application, the results of a series of investigations which may be summed up as showing that the best results are obtained for commercial purposes at temperatures between zero to 10° centigrade with an initial concentration of 6 grams of sodium hydroxide per 100 c. c. of solution.

The alpha cellulose products, by the said process, average from 94 to 96% of actual but it has been found occasionally that despite all precautions, instead of obtaining a maximum of 96%, the product will be found to contain only 94% of the desired alpha cellulose.

Inasmuch as alpha cellulose is sold to specification, and the use thereof depends upon the uniformity of the said alpha cellulose content, the present process was devised in order to insure a raw material which would uniformly give the desired high alpha cellulose.

The process of the present invention comprises the treatment of cornstalk cellulose with water, under pressure and heat, and is carried out as follows:

The cornstalk cellulose pulp, already bleached and ordinarily ready to be converted into paper pulp or paper, is placed in a digester, preferably of the circulating type, together with sufficient water to form a readily flowing pulp, and heated therein until the water is brought to the boiling point and an internal pressure of 5 pounds above that over the atmosphere is developed. This boiling of the cellulose in the water, under pressure, is continued for about one hour, at the end of which time the contents of the digester are discharged and the cellulose filtered therefrom and then subjected to the alkali treatment in accordance with the process invented by me and James S. Sconce, as laid down in the aforesaid co-pending application and as hereinabove described.

It is found that high alpha-cellulose prepared by the already mentioned process and from cellulose treated in accordance with the present invention, yields a pulp which, when made into sheets, shows a very low degree of hydration and yields a much softer paper, having a higher tearing strength; in other words, boiling under pressure in water removes some of the constituents of the cellulose which interfere with the perfect operation of high alpha cellulose process disclosed in copending application Serial No. 385,061. The process is also applicable to cellulose to lower its degree of hydration so that a softer paper results.

What I claim and desire to protect by Letters Patent is:

1. The process of conditioning cellulose derived from plants of annual growth, for the manufacture of high alpha cellulose therefrom which comprises subjecting said cellulose in the bleached condition to the action of water under pressure and heat.

2. A process as defined in claim 1, wherein the temperature is equivalent to a pressure of 5 pounds super atmospheric.

3. The process of conditioning cellulose which comprises subjecting the same, after bleaching and washing, to the action of water under heat and pressure.

4. The process of treating bleached cornstalk cellulose which comprises placing the same into a digester together with water and thereupon subjecting the contents of the digester to heat sufficient to boil the water until the pressure in the digester rises to substantially five pounds above atmospheric, and maintaining said pressure by heat for about one hour, and thereafter releasing the pressure and separating the cellulose from the water.

In witness whereof, I have hereunto subscribed my name.

ELTON R. DARLING.